United States Patent [19]

Romine

[11] 4,213,247
[45] Jul. 22, 1980

[54] THREAD COMPLIANCE GAUGE

[76] Inventor: Ernest H. Romine, 2301 Walnut Blvd., Walnut Creek, Calif. 94596

[21] Appl. No.: 9,796

[22] Filed: Feb. 7, 1979

[51] Int. Cl.$^2$ ............................................. G01B 3/36
[52] U.S. Cl. ................................. 33/199 R; 33/174 Q
[58] Field of Search .............. 33/199 B, 199 R, 174 Q

[56] References Cited

U.S. PATENT DOCUMENTS

| | | | |
|---|---|---|---|
| 1,905,705 | 4/1933 | Hartness | 33/199 R |
| 2,770,050 | 11/1956 | Johnson | 33/174 Q X |
| 2,782,521 | 2/1957 | Parker et al. | 33/199 R |
| 3,270,427 | 9/1966 | Johnson | 33/199 R |
| 3,280,469 | 10/1966 | Andreasen | 33/199 R |

Primary Examiner—William D. Martin, Jr.
Attorney, Agent, or Firm—Bruce & McCoy

[57] ABSTRACT

A thread compliance gauge for determining the accuracy with which threads have been formed on a shaft.

5 Claims, 7 Drawing Figures

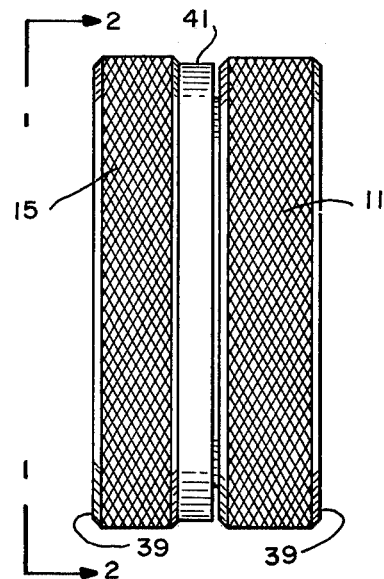
FIG.—1
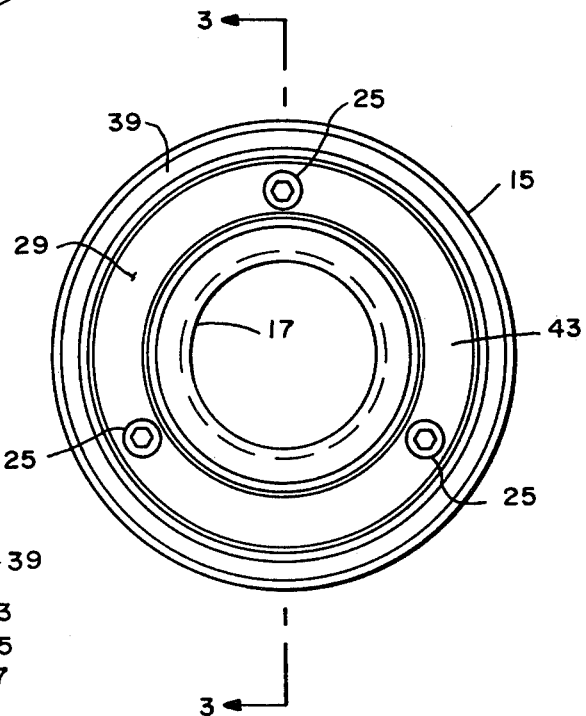
FIG.—2
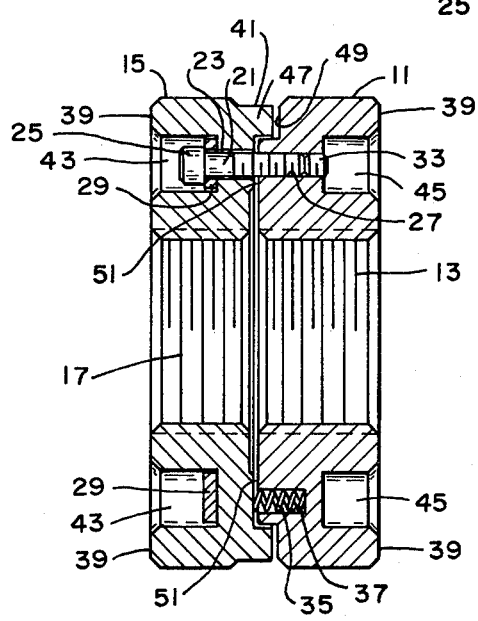
FIG.—3

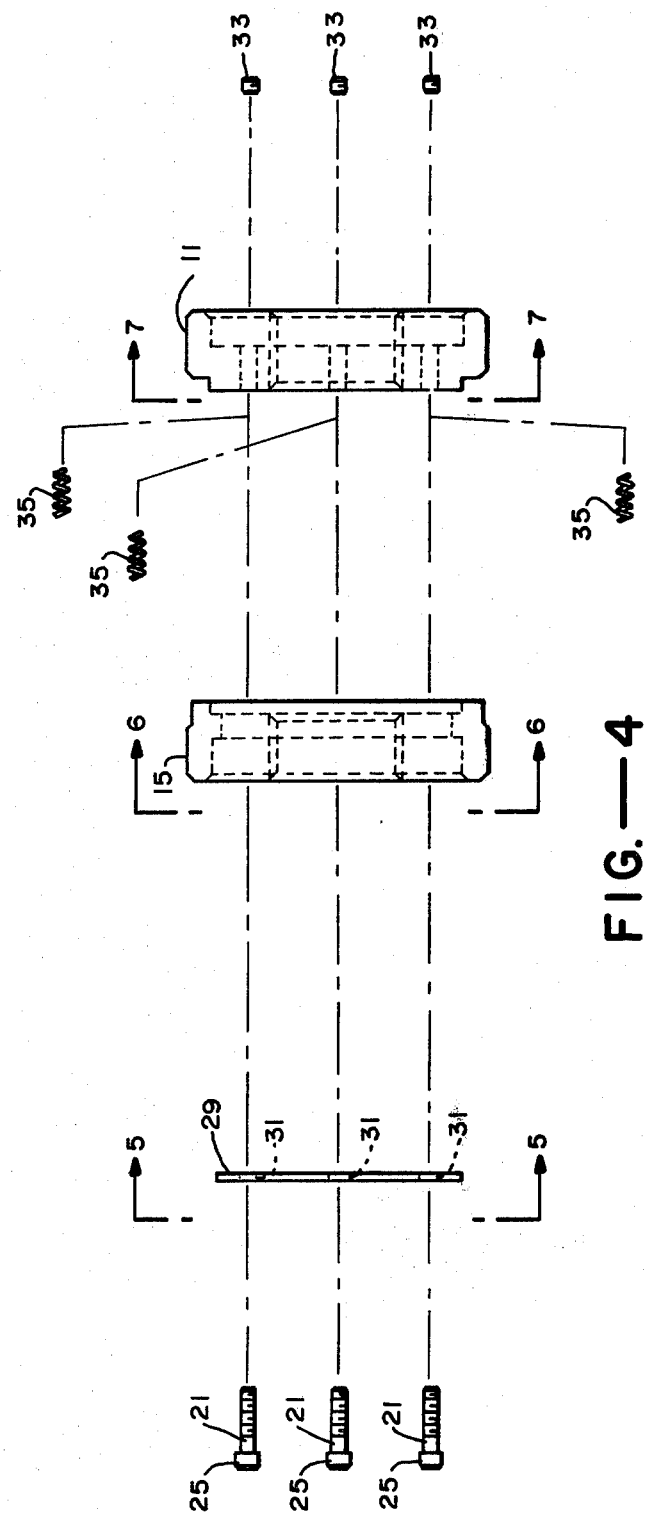
FIG.—4
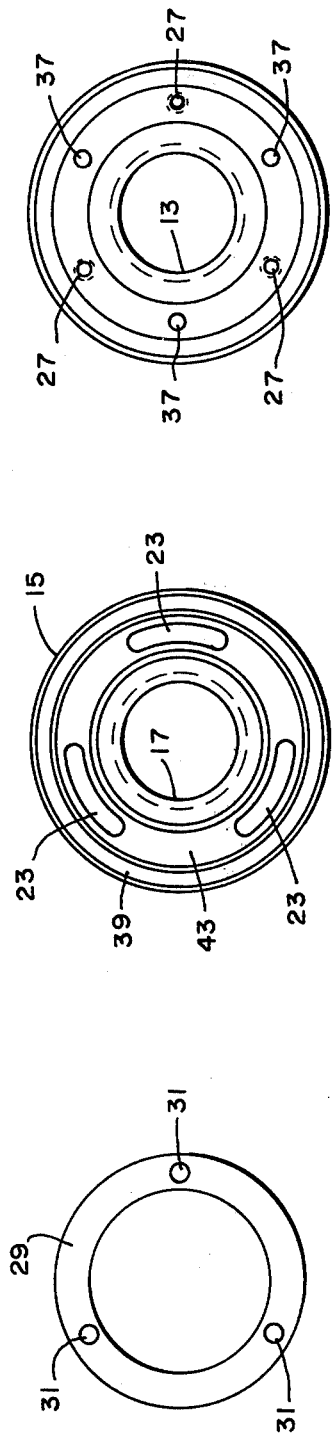
FIG.—7
FIG.—6
FIG.—5

THREAD COMPLIANCE GAUGE

BACKGROUND OF THE INVENTION

1. Field of the Invention

The present invention relates to thread compliance gauges and particularly to a gauge for determining the accuracy with which the threading of a shaft has been accomplished.

2. Description of the Prior Art

There is no known prior art. The thread forming industry has always been plagued with the inability to quickly and accurately determine the concentricity or skewdness of threads formed on a shaft. Thread gauges exist which measure the pitch diameter of a threaded shaft which is the distance between the midpoints of the opposite flank surfaces of the screw threads. The pitch diameter measurement is of primary importance in accurate thread forming as it is the flank surfaces of the threads that must make precision contact with the flank surfaces of mating threads to achieve a strong threaded connection. The inner and outer diameter measurements of the threads are of secondary importance as these areas of the threads do not make contact with the mating threads. Two other parameters of importance in determining accuracy of threading are the concentricity and skewedness of the threads formed on the shaft with respect to the axis of rotation of the shaft. Existing devices do not measure these important parameters. While threads may have the proper pitch diameter, they may be formed in such a non-concentric or skewed manner as to be unsuitable for close tolerance work. The present invention is the only known device for checking these parameters.

SUMMARY OF THE INVENTION

The thread compliance gauge of the present invention indicates whether the axis of generation of the threads formed onto a shaft is coincident with the axis of rotation of the shaft. It comprises first and second members that are formed with internally threaded apertures which are threadably engagable with the threaded shaft. The two members are formed with a means for effecting the interlocking of the members together while permitting relative rotation thereof with respect to each other for a portion of a revolution. When the two interlocked members are engaged on the threaded shaft, they are rotated apart to tighten the two sets of threads of the members on the flank surfaces of the threads formed on the shaft, thereby centering the members on the axis of generation of the threads of the shaft.

One of the members has a cylindrical surface formed thereon which is concentric to the axis of generation of the internal threads thereof. When the two members are interlocked and engaged with the flank surfaces of the threads of the shaft and thereby centered on the axis of generation of the threads of the shaft, the shaft may be rotated and the concentricity of the threads formed on the shaft can then be checked with respect to the axis of rotation of the shaft by measuring the concentricity of the rotating cylindrical surface of the member with respect to the axis of rotation of the shaft.

One of the members has a flat surface formed thereon which is perpendicular to the axis of generation of the internal threads thereof. When the two members are interlocked and engaged with the flank surfaces of the threads of the shaft and thereby centered on the axis of generation of the threads of the shaft, the shaft may be rotated and the skewedness of the screw threads formed on the shaft can then be checked with respect to the axis of rotation of the shaft by measuring the wobble of the rotating perpendicular surface with respect to the axis of rotation of the shaft.

OBJECTS OF THE INVENTION

It is therefore an important object of the present invention to provide a thread compliance gauge that is nondestructive, quick and easy to use, relatively inexpensive to manufacture, and yet provides precision measurement of the accuracy with which threads have been formed on a shaft.

It is another object of the present invention to provide a gauge that will determine whether the screw threads formed on a shaft are skewed with respect to the axis of rotation of the shaft.

It is a further object of the present invention to provide a gauge for determining whether screw threads formed on a shaft are concentric to the axis of rotation of the shaft.

Other objects and advantages of the invention will become apparent when it is considered in conjunction with the accompanying drawings.

DESCRIPTION OF THE DRAWINGS

FIG. 1 is a side elevational view of the THREAD COMPLIANCE GAUGE of the present invention;

FIG. 2 is a front elevational view thereof taken along lines 2—2 of FIG. 1;

FIG. 3 is a cross-sectional view thereof taken along lines 3—3 of FIG. 2;

FIG. 4 is an assembly drawing thereof;

FIG. 5 is a front elevational view of the retaining ring of the present invention taken along lines 5—5 of FIG. 4;

FIG. 6 is a front elevational view of the slotted ring member of the present invention taken along lines 6—6 of FIG. 4; and FIG. 7 is a front elevational view of the studded ring member of the present invention taken along lines 7—7 of FIG. 4.

DESCRIPTION OF THE PREFERRED EMBODIMENT

The preferred embodiment of the thread compliance gauge of the present invention includes a first member 11 that is formed as a ring which includes a threaded center hole 13 for engagement with a threaded shaft and a second ring member 15 which also has a threaded center hole 17 for engagement with the same threaded shaft. The threading of these members is accomplished by the most accurate process available: presently, it is done by an internal thread grinding process. The first and second ring members are interlocked together in such a manner that the rings may move in a rotational mode relative to each other. The interlocking is accomplished by at least one but preferably three projecting studs 21, each of which is disposed parallel to the axis of generation of the internally formed threads and projects from one of the ring members, hereafter termed the studded ring member 11, and passes through an arc shaped slot 23 in the other ring member, hereafter termed the slotted ring member 15. Each arc shaped slot is formed to be concentric with and equidistant from the threaded center hole of its ring. To prevent the head of a projecting stud from passing through its arc shaped slot, a flange or cap 25 is attached to the head of the projecting stud which is larger than the width of the arc shaped slot 23, whereby the slotted ring member 15 is captured between the studded ring member 11 and the stud flange 25.

In the preferred embodiment, three cap screws 21 are utilized as the projecting studs to interlock the two ring members together; each cap screw being engaged in a threaded screw hole 27 formed in the studded ring member 11. The screw holes 27 are disposed equidistant from the axis of generation of the internal threads of the ring member and situated at approximately 120° intervals from each other. Three arc shaped slots 23 are provided in the slotted ring member 15, one for the shaft of each cap screw to pass through. The cap screws and arc shaped slots are formed and disposed so that the two interlocked ring members may move in a rotational mode relative to each other an angular distance that is limited by the movement of the cap screw shafts in the arc shaped slots. This angular movement being the arc distance of the slot less the arc distance subtended by the cap screw shaft residing in the slot.

A retaining ring 29 is provided to aid in preventing the caps 25 of the three cap screws from passing through the arc shaped slots and for evening out the pressure and wear on the parts. This retaining ring 29 is located on the opposite side of the slotted ring member from the studded ring member. It contains holes 31 of proper diameter to allow the shafts of the cap screws to pass therethrough but prevent the caps 25 of the cap screws from passing through, whereby the caps of the cap screws bear against the retaining ring. Each cap screw 21 thus passes through a hole 31 in the retaining ring 29, through an arc shaped slot 23 in the slotted ring member 15, and thence into a threaded screw hole 27 in the studded ring member 11.

To assure that each cap screw extends from its threaded screw hole a distance that is identical to the other cap screws, the threaded holes 27 in the studded ring member which receive the cap screws are formed to pass completely through the ring member. A set screw 33 is inserted into each of the threaded screw holes to a predetermined depth such that each threaded screw hole which receives a cap screw is of the same depth, and cap screws of identical length are utilized.

Means are provided to urge the two ring members apart when they are interlocked. A multiplicity, preferably three, coil springs 35 are disposed to reside in, and protrude from, coil spring holes 37 that are formed in one of the ring members. Upon interlocking of the two ring members, the protruding portions of the coil springs contact and are compressed by the other ring member. As a result, the coil springs urge the ring members apart such that the caps of the cap screws bear against the retaining ring.

At least one of the two ring members has a smooth outer indexing surface 39 that is formed in a plane that is perpendicular to the axis of generation of the threaded center hole of the ring members. In addition, at least one of the ring members includes a cylindrical indexing surface 41 which is formed as a smooth band encircling the periphery of the ring member concentric to the axis of generation of the threaded center hole.

In the embodiment of the invention as depicted in FIG. 3 the retaining ring 29 is recessed 43 into the body of the slotted ring member 15 and there is a corresponding recess 45 in the body of the studded ring member 11.

These recesses serve to lighten the weight of the device and do not comprise features essential to its operation. Likewise depicted in FIG. 3 is a cylindrical lip 47 of the slotted ring member 15 which resides in a recess 49 in the studded ring member 11. These lip-recess configuration aids in the alignment of the device during assembly but is not a feature that is essential to its functioning as a thread gauge.

To operate the invention, the threaded shaft which is to be checked for compliance, is arranged to rotate accurately on its longitudinal axis of rotation. This is done by mounting the threaded shaft between its centers so it can be rotated such as by hand. To determine the accuracy with which the threading has been accomplished, the gauge must first be engaged with the shaft by screwing it on the threads. To accomplish this, the two interlocked ring members of the gauge must be initially rotated relative to each other to a position which creates an aligned continuous thread of the threaded center holes of the two ring members. This allows the two ring members to be screwed onto the threaded shaft by virtue of the continuous threading. After engagement with the threaded shaft, one of the interlocked ring members is rotated relative to the other in a direction that will tend to separate the two ring members on the threads of the shaft. The separation continues until the caps 25 of the cap screws become tight against the retaining ring 29.

Separational movement of the ring members is stopped by the cap screws bearing against retaining ring, and this causes the flank surfaces of the internal threads of the ring members to tighten onto the flank surfaces of the screw threads of the shaft. This occurs because the tightening of the cap screws against the retaining ring prevents further separation of the two ring members caused by the relative rotation thereof whereby the threads of the ring members engage the threads of the shaft until they are tight in compression on the flank surfaces of the shaft threads. Due to the compressive force holding the two ring members together, each ring member acts on an opposite flank surface of the threads on the shaft whereby all of the flank surfaces of the threads on the shaft which are contacted by both ring members of the gauge are checked in one operation. The ring members, when thus tightened on the shaft, are centered with respect to the axis of generation of the threads of the shaft.

To permit the relative rotational movement of the ring members that is required for centering the gauge on the threaded shaft, the cap screws 21 must initially be long enough to leave a small gap 51 between the ring members when the cap screws are fully screwed into the studded ring member. This gap permits the ring members to be easily rotated with respect to each other while the cap screws are tight. The gap is created during assembly of the gauge by placing a set screw 33 into each threaded screw hole 27 a predetermined depth, thereby limiting the depth to which the cap screws may be screwed into the studded ring member. It is important that the width of the gap 51, as allowed by each cap screw, be identical, otherwise the gauge would itself be skewed upon centering and not accurately reflect the skewed nature of the threads of the shaft. Thus, the cap screws must be equal length and the set screws must be identically placed in the threaded screw holes.

The internal threading of the two ring members must be accomplished as though it were a continuous thread that will allow them to smoothly screw onto the shaft as a unit with the gap between the two ring members taken into account. This is most easily accomplished by initially forming both ring members from a single internally threaded piece of stock which is marked on the side for future alignment. Three holes, which will become the threaded screw holes, are drilled through the single piece parallel to the axis of generation of the internal threads, and the piece is then cut in half to create the two ring members. The arc-shaped slots are cut in one member utilizing the three drilled holes as guides and the three drilled holes are threaded in the other member to create the studded member. Set screws are positioned in the threaded screw holes such that when the two ring members are aligned utilizing the alignment marking and joined by inserting and tightening the three cap screws, there will be a small gap between the two ring members to allow ease of rotational movement relative to each other. Coil spring holes are then drilled in one of the ring members and in the embodiment depicted herein they are drilled in the studded ring member. The cylindrical and perpendicular surfaces may be formed on the ring members either before or after the initial piece of stock is cut in half.

The compressed coil springs supply firmness to the mechanical relationship of the ring members of the gauge, as without these compressed coil springs, and due to the gap between the ring members, the two ring members and retaining ring have free play to the extent of the gap.

After the gauge is engaged with the threaded shaft to be checked and centered on threads thereof it becomes possible to determine the accuracy with which the threading of the shaft has been accomplished. The determination can be made by means of a standard fixed dial indicator, not shown, which is arranged to track the perpendicular indexing surface 39 of the gauge when the threaded shaft is slowly rotated. Movement or wobble of the perpendicular indexing surface 39 will cause the dial indicator to fluctuate which indicates that the axis of generation of the screw threads as cut on the shaft is skewed relative to the axis of rotation of the shaft. The dial indicator can also be arranged to ride on the cylindrical indexing surface 41 formed on the periphery of the gauge. The threaded shaft is again slowly rotated and fluctuation of the reading on the dial indicator indicates that the axis of generation of the screw threads as cut on the shaft is not concentric with the axis of rotation of the shaft. It is obvious that other types of indicators may be utilized to determine and record the movement of the indexing surfaces of the gauge and thereby indicate the accuracy with which the threading of the shaft has been accomplished.

To make a single device suitable for checking the various types and diameters of threads in the marketplace, thus obviating the necessity for manufacturing a gauge for each type and diameter of thread, the device, as described in the preferred embodiment, may be altered to accept variously threaded inserts into the center hole. In this embodiment the center hole of each ring member could be formed as a smooth surface with a key channel cut along its face. A set of several threaded inserts corresponding to threads of various types and diameters, each formed to fit into the keyed center holes of the ring members, can then be utilized to adapt a single thread gauge to the many types and diameters of threads which require checking. This configuration would allow for the inexpensive manufacture of a single gauge with several inserts which would have the capability of checking a variety of types and diameters of threads.

The present invention provides an effective and heretofore the only known gauge for measuring the concentricity and skewedness of the threads that have been formed on a shaft. It will be seen from the foregoing description that the invention will achieve the objects attributable thereto, and while it has been described in detail, it is not to be limited to such details except as may be necessitated by the appended claims.

What I claim is:

1. A thread compliance gauge for determining the accuracy with which screw threads have been formed on a shaft comprising first and second ring members formed with internally threaded apertures which are threadably engagable with said shaft, means for interlocking said ring members together and permitting relative rotation thereof with respect to each other for a portion of a revolution whereby as said members are rotated apart when interlocked and engaged on said threaded shaft the members tighten on the flank surfaces of the threads of the shaft and thereby center on the axis of generation of the threads of the shaft, said means for interlocking said ring members including at least one projecting stud formed on one of said ring members and disposed parallel to the axis of generation of the internal threads of said ring member, said stud extending through a corresponding arc shaped slot formed in the other of said ring members and having a flange which is disposed on the opposite side of the slotted ring member from the studded ring member so that as said ring members are moved apart by rotation during the centering process said flange prevents said ring members from separating beyond a limit permitted by the flange on the stud whereby said ring members are interconnected and permit limited relative rotation with respect to each other, said stud and flange being formed to create an equidistant gap between the ring members when said members are separated to the limit permitted by the flange on the stud; and a cylindrical surface formed on one of said members concentric to the axis of generation of the internal threads thereof whereby when said members are interlocked and engaged with said shaft and centered with respect to the axis of generation of the threads thereof the shaft may be rotated and the concentricity of the screw threads formed thereon may be checked with respect to the axis of rotation of the shaft by measuring the concentricity of the rotating cylindrical surface with respect to the axis of rotation of the shaft.

2. The thread compliance gauge of claim 1 wherein a flat surface is formed on one of said ring members and is disposed in a plane perpendicular to the axis of generation of the internally formed threads thereof whereby when said members are interlocked and engaged with said shaft and centered with respect to the axis of generation of the threads formed on said shaft the shaft may be rotated and the skewedness of the screw threads formed thereon may be checked with respect to the axis of rotation of the shaft by measuring the wobble of the rotating perpendicular surface with respect to the axis of rotation of the shaft.

3. The thread compliance gauge of claim 1 wherein means are provided to urge said ring members apart.

4. The thread compliance gauge of claim 1 wherein said threaded apertures of said ring members are formed as removable threaded inserts, allowing a user to utilize threaded inserts having different types and sizes of threads in a single gauge.

5. A thread compliance gauge for determining the accuracy with which screw threads have been formed on a shaft, comprising first and second ring members formed with internally threaded center holes of a preselected standard thread gauge and being threadably engagable with said shaft, means interlocking said ring members including at least three equally spaced flanged studs which are disposed parallel to and equidistant from the axis of generation of said internal threads of said ring members, said studs projecting from one of said ring member and designed to project through corresponding arc shaped slots formed in the other of said ring members and acting to interlock the two ring members yet permitting the two ring members to have sufficient play to be rotated with respect to each other a portion of a rotation on said shaft whereby as the ring members are rotated apart when interlocked and engaged on said shaft the two ring members separate to the extent permitted by the flanges of the studs and center on the axis of generation of the threads formed on the shaft, said studs being formed by cap screws screwed into screw holes formed through said studded ring member and set screws being disposed in said screw holes at a predetermined depth to provide an equidistant gap between said ring members when said cap screws are bottomed out against set screws and the ring members are separated to the fullest extent permitted by said cap screws, a retaining ring with holes formed therein to permit the shafts of said studs to extend therethrough, said retaining ring being disposed between the flanges of the studs and the slotted ring member, a multiplicity of coil springs disposed between said ring members urging said ring members apart, one of said ring members having a flat surface disposed in a plane perpendicular to the axis of generation of the internally formed threads thereof whereby when said ring members are engaged with said shaft and centered with respect to the axis of generation of the threads formed on said shaft, the shaft may be rotated and the skewedness of the screw threads formed thereon may be checked with respect to the axis of rotation of the shaft by measuring the wobble of the rotating perpendicular surface with respect to the axis of rotation of the shaft, and one of said ring members having a cylindrical surface which is formed concentric with the axis of generation of the internally formed threads thereof whereby when said ring members are interlocked and engaged with said shaft and centered with respect to the axis of generation of the threads formed on said shaft, the shaft may be rotated and the concentricity of the screw threads formed thereon may be checked with respect to the axis of rotation of the shaft by measuring the concentricity of the rotating cylindrical surface with respect to the axis of rotation of the shaft.

* * * * *